US012409827B2

(12) United States Patent
Heisel et al.

(10) Patent No.: US 12,409,827 B2
(45) Date of Patent: Sep. 9, 2025

(54) AXLE TORQUE GRADE ASSIST

(71) Applicant: GM Global Technology Operations LLC, Detroit, MI (US)

(72) Inventors: Adam J. Heisel, South Lyon, MI (US); Nicholas Michael Cococcetta, Davisburg, MI (US); Daniel Lee Baibak, White Lake, MI (US); Robert C. Gibson, Plymouth, MI (US); Brian Kalinowski, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/437,666

(22) Filed: Feb. 9, 2024

(65) Prior Publication Data

US 2025/0256697 A1     Aug. 14, 2025

(51) Int. Cl.
    *B60W 10/16*     (2012.01)

(52) U.S. Cl.
    CPC ......... *B60W 10/16* (2013.01); *B60W 2520/10* (2013.01); *B60W 2540/10* (2013.01); *B60W 2552/15* (2020.02)

(58) Field of Classification Search
    CPC ............. B60W 10/16; B60W 2552/15; B60W 2520/10; B60W 2540/10; B60W 30/18054; B60W 30/18118
    See application file for complete search history.

(56) References Cited

U.S. PATENT DOCUMENTS

| | | | |
|---|---|---|---|
| 2005/0017580 A1* | 1/2005 | Cikanek ............... | B60W 20/00 303/191 |
| 2009/0048755 A1 | 2/2009 | Tokimasa et al. | |
| 2010/0145559 A1* | 6/2010 | Gauthier ............... | B60W 10/06 903/902 |
| 2013/0096797 A1 | 4/2013 | Whitney et al. | |

(Continued)

FOREIGN PATENT DOCUMENTS

| | | |
|---|---|---|
| DE | 102008032506 A1 | 1/2009 |
| DE | 102012218295 A1 | 8/2013 |

(Continued)

OTHER PUBLICATIONS

German Application No. 10 2024 108 809.5 filed Mar. 27, 2024; German Office Action dated Sep. 26, 2024; 5 pages.

*Primary Examiner* — Lori Wu
(74) *Attorney, Agent, or Firm* — CANTOR COLBURN LLP

(57) ABSTRACT

A vehicle includes a system that performs a method of operating the vehicle. The system includes a road grade sensor for measuring a road grade of a road section being traversed by the vehicle, a speedometer for measuring a vehicle speed, a power flow direction sensor for obtaining a power flow direction of the vehicle, a pedal position sensor for measuring a pedal position, and a processor. The processor is configured to determine an axle torque upper limit for a motor of the vehicle based on the road grade, the vehicle speed and the power flow direction, determine an axle torque request based on the vehicle speed and the pedal (Continued)

position, determine a clipped axle torque request from the axle torque request and the axle torque upper limit, and control the vehicle by implementing the clipped axle torque request at the vehicle.

20 Claims, 5 Drawing Sheets

(56) References Cited

U.S. PATENT DOCUMENTS

| | | | |
|---|---|---|---|
| 2016/0009277 A1* | 1/2016 | Kava | B60W 30/143 180/65.265 |
| 2016/0121755 A1 | 5/2016 | Nishiyama et al. | |
| 2018/0264971 A1 | 9/2018 | Lor et al. | |
| 2022/0097706 A1* | 3/2022 | Bolger | B60W 50/0205 |

FOREIGN PATENT DOCUMENTS

| | | |
|---|---|---|
| DE | 102015118420 A1 | 5/2016 |
| DE | 102017204042 A1 | 9/2018 |
| DE | 102018104484 A1 | 9/2018 |
| WO | 2018162535 A1 | 9/2018 |

* cited by examiner

AXLE TORQUE GRADE ASSIST

INTRODUCTION

The subject disclosure relates to operation of a vehicle and, in particular, to a system and method for adjusting a torque limit for torque applied to an axle of a vehicle.

Electric vehicles can be used in different scenarios. In many scenarios, vehicles are used over long driving intervals with few stops. In other scenarios, some vehicles experience short driving intervals with many stops and starts during their use. Such scenarios with short driving intervals include uses such as a delivery van or delivery truck, use as a taxi or ride-sharing vehicle. This type of start-and-stop driving leads to wear on the vehicle, such as tire wear, mount wear, axle wear, etc. In order to counteract these effects, a static limit is applied to the vehicle to limit the amount of torque that can be applied to the axles of the vehicle. However, when the vehicle is on a hill or road grade, this limit impedes the performance of the delivery vehicle. Accordingly, it is desirable to provide a method for adjusting a limit for axle torque to account for the effects of road grade.

SUMMARY

In one exemplary embodiment, a method of operating a vehicle is disclosed. A road grade of a road section being traversed by the vehicle is measured using a road grade sensor located on the vehicle. An axle torque upper limit for a motor of the vehicle is determined based on the road grade, a vehicle speed and a power flow direction of the vehicle. An axle torque request is determined based on the vehicle speed and a pedal position. A clipped axle torque request is determined from the axle torque request and the axle torque upper limit. The vehicle is controlled by implementing the clipped axle torque request at the vehicle.

In addition to one or more of the features described herein, the clipped axle torque request is a minimum value of the axle torque request and the axle torque upper limit.

In addition to one or more of the features described herein, wherein the power flow direction is in a forward gear, the method further includes determining the axle torque upper limit at one of a first value when the road grade is within a zero-grade range having an upper grade threshold, a second value greater than the first value when the road grade is a positive value greater than the upper grade threshold, and the first value when the road grade is negative.

In addition to one or more of the features described herein, wherein the power flow direction is in a reverse gear, the method further includes determining the axle torque upper limit at one of a first value when the road grade is within a zero-grade range having a lower grade threshold, the first value when the road grade is positive, and a second value greater than the first value when the road grade is negative and less than the lower grade threshold.

In addition to one or more of the features described herein, the axle torque upper limit increases as the road grade increases when the vehicle is moving uphill.

In addition to one or more of the features described herein, further including selecting a default road grade value when at least one of a road grade measurement is not valid and the power flow direction is not valid.

In addition to one or more of the features described herein, the road grade sensor is an accelerometer.

In another exemplary embodiment, a system for operating a vehicle is disclosed. The system includes a road grade sensor for measuring a road grade of a road section being traversed by the vehicle, a speedometer for measuring a vehicle speed, a power flow direction sensor for obtaining a power flow direction of the vehicle, a pedal position sensor for measuring a pedal position, and a processor. The processor is configured to determine an axle torque upper limit for a motor of the vehicle based on the road grade, the vehicle speed and the power flow direction, determine an axle torque request based on the vehicle speed and the pedal position, determine a clipped axle torque request from the axle torque request and the axle torque upper limit, and control the vehicle by implementing the clipped axle torque request at the vehicle.

In addition to one or more of the features described herein, the processor is further configured to determine the clipped axle torque request as a minimum value of the axle torque request and the axle torque upper limit.

In addition to one or more of the features described herein, the power flow direction is in a forward gear and the processor is further configured to determine the axle torque upper limit at one of a first value when the road grade is within a zero-grade range having an upper grade threshold, a second value greater than the first value when the road grade is a positive value greater than the upper grade threshold, and the first value when the road grade is negative.

In addition to one or more of the features described herein, the power flow direction is in a reverse gear and the processor is further configured to determine the axle torque upper limit at one of a first value when the road grade is within a zero-grade range having a lower grade threshold, the first value when the road grade is positive, and a second value greater than the first value when the road grade is negative and less than the lower grade threshold.

In addition to one or more of the features described herein, the axle torque upper limit increases as the road grade increases when the vehicle is moving uphill.

In addition to one or more of the features described herein, the processor is further configured to select a default road grade value when at least one of a road grade measurement is not valid and the power flow direction is not valid.

In addition to one or more of the features described herein, the road grade sensor is an accelerometer.

In yet another exemplary embodiment, a vehicle is disclosed. The vehicle includes a road grade sensor for measuring a road grade of a road section being traversed by the vehicle, a speedometer for measuring a vehicle speed, a power flow direction sensor for obtaining a power flow direction of the vehicle, a pedal position sensor for measuring a pedal position, and a processor. The processor is configured to determine an axle torque upper limit for a motor of the vehicle based on the road grade, the vehicle speed and the power flow direction, determine an axle torque request based on the vehicle speed and the pedal position, determine a clipped axle torque request from the axle torque request and the axle torque upper limit, and control the vehicle by implementing the clipped axle torque request at the vehicle.

In addition to one or more of the features described herein, the processor is further configured to determine the clipped axle torque request as a minimum value of the axle torque request and the axle torque upper limit.

In addition to one or more of the features described herein, the power flow direction is in a forward gear and the processor is further configured to determine the axle torque upper limit at one of a first value when the road grade is within a zero-grade range having an upper grade threshold, a second value greater than the first value when the road grade is a positive value greater than the upper grade threshold, and the first value when the road grade is negative.

In addition to one or more of the features described herein, the power flow direction is in a reverse gear and the processor is further configured to determine the axle torque upper limit at one of a first value when the road grade is within a zero-grade range having a lower grade threshold, the first value when the road grade is positive, and a second value greater than the first value when the road grade is negative and less than the lower grade threshold.

In addition to one or more of the features described herein, the axle torque upper limit increases as the road grade increases when the vehicle is moving uphill.

In addition to one or more of the features described herein, the processor is further configured to select a default road grade value when at least one of a road grade measurement is not valid and the power flow direction is not valid.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
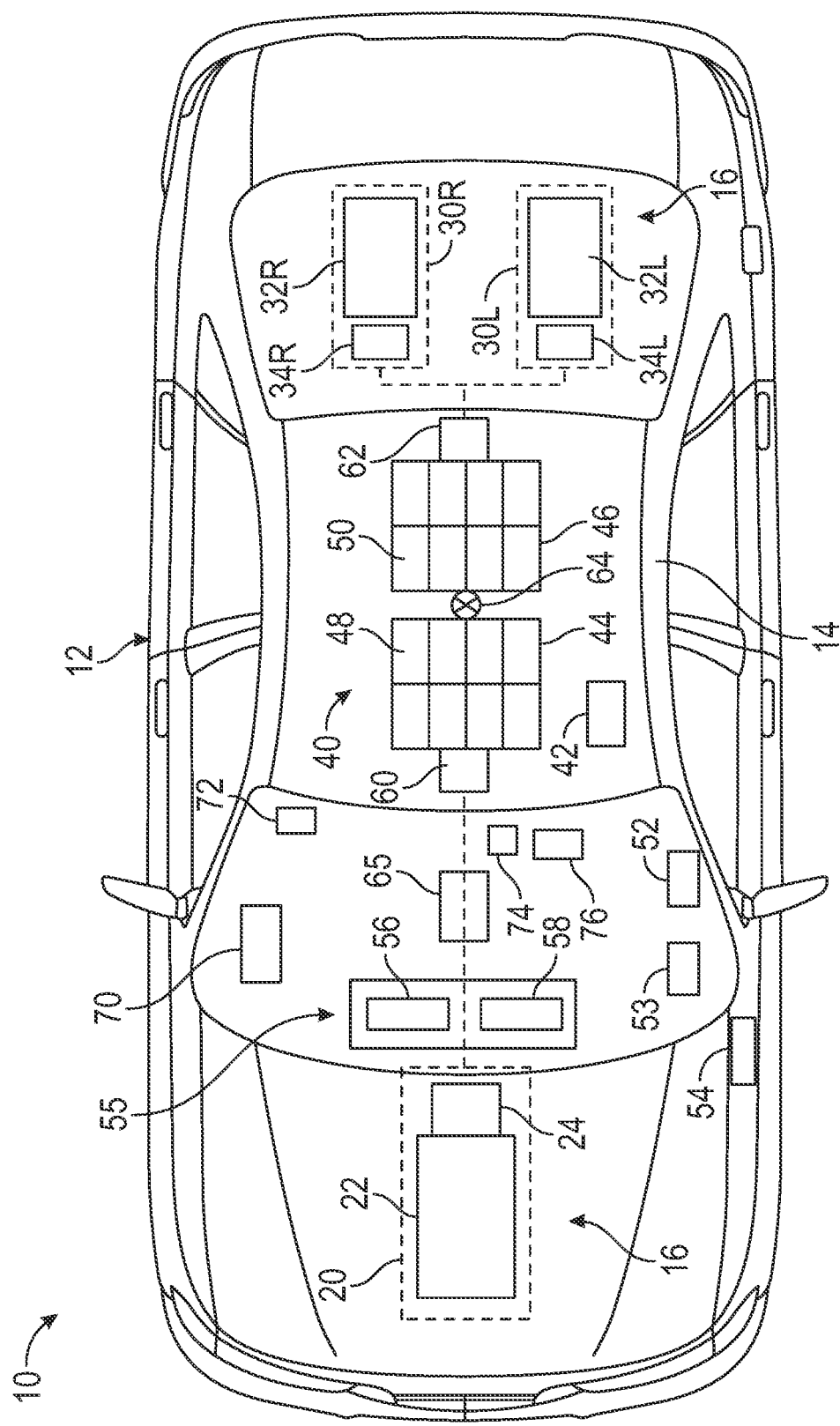
FIG. 1 shows an embodiment of a vehicle, in an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), an internal combustion engine vehicle, a hybrid vehicle or any other type of vehicle. For illustrative purposes, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to a battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery.

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit and may use an existing controller such as a drive system controller, an RESS controller, and/or controllers in the drive system. For example, a controller 65 may be included for drive control operations as discussed herein.

The controller 65 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 65 may include a non-transitory computer-readable medium that stores instructions which, when processed by one or more processors of the controller 65, implement a method of determining an upper limit to axle torque than can be provided to an axle (or wheel) of the vehicle based on road grade experienced by the vehicle and controlling operation of a power train to provide an axle torque that does not exceed this upper limit, according to one or more embodiments detailed herein.

The vehicle 10 also includes a road grade sensor 70, a power flow direction sensor 72, a speedometer 74 and a pedal position sensor 76. The road grade sensor 70 can be used to determine or measure a road grade of a road section being traversed by the vehicle. In various embodiments, the road grade sensor 70 is an accelerometer. The controller 65 monitors the road grade sensor 70 to determine a validity of road grade measurements. For example, a road grade measurement needs to be recorded over a sufficient amount of time to be considered valid. The power flow direction sensor 72 detects a power flow direction (i.e., forward, reverse) of the drive unit(s) of the vehicle 10. The speedometer 74 measures a speed of the vehicle 10 (vehicle speed). The pedal position sensor 76 detects a pedal position (i.e., a position of an acceleration pedal).

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

Figure 2:
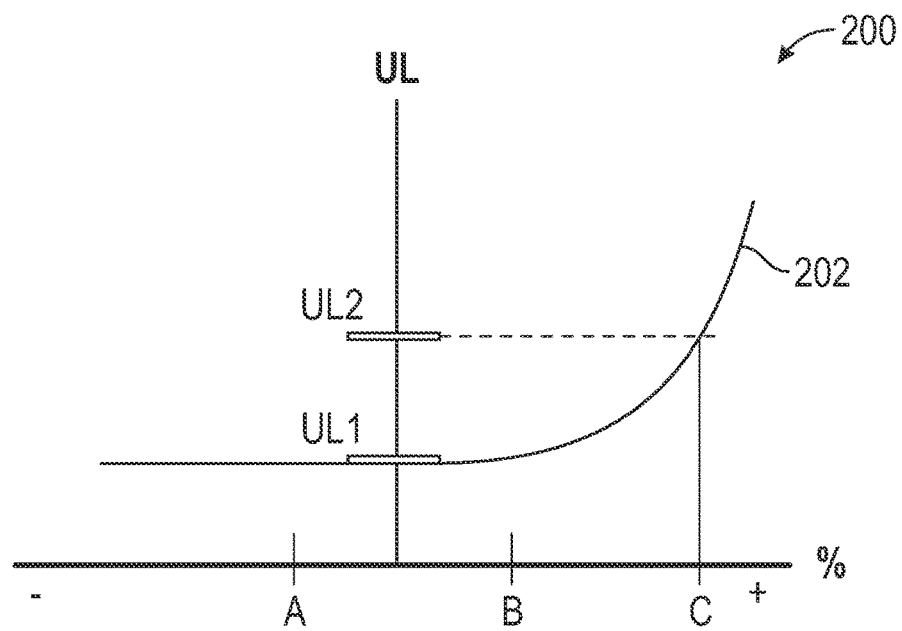
FIG. 2 shows a relation between axle torque upper limit and road grade for a vehicle in forward gear, in an illustrative embodiment.

FIG. 2 shows a relation 200 between axle torque upper limit and road grade for a vehicle in forward gear, in an illustrative embodiment. Road grade is shown as a percentage (%) along the abscissa and axle torque upper limit values (UL) are shown along the ordinate axis. The axle torque upper limit is shown by curve 202. When the road grade is zero or near zero, the axle torque upper limit is at a first value (UL1), which is generally a smallest value for the limit. A zero-grade range extends from a lower grade threshold A to an upper grade threshold B. For example, a zero-grade range can extend about −5% to about +5%. For positive grades greater than the upper grade threshold, the curve 202 increases as road grade increases. An illustrative road grade is shown at C along the abscissa, which relates to a second value for the axle torque upper limit. The second value is greater than the first value. For negative grades less than the lower grade threshold, the curve 202 remains at the first value.

Figure 3:
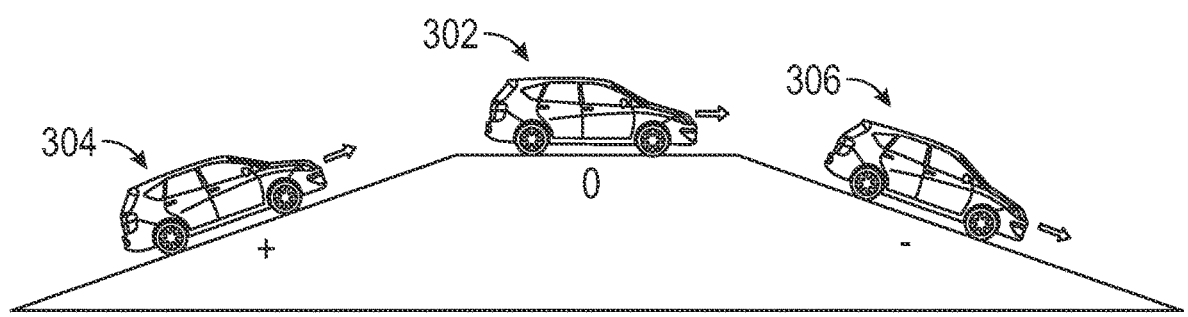
FIG. 3 shows three road grades being traversed by an electric vehicle with its drive unit in forward gear.

FIG. 3 shows three road grades being traversed by an electric vehicle with its drive unit in forward gear. In a first forward gear scenario 302, the road grade is zero or near zero (i.e., the vehicle is on a horizontal or near-horizontal terrain) and the torque limit is set at a first value (UL1) suitable for such horizontal terrain. In a second forward gear scenario 304, the road grade is a positive value, (i.e., the vehicle is moving uphill) and the torque limit is raised from the first value (UL1) to the second value (UL2). In a third forward gear scenario 306, the road grade is negative (i.e., the vehicle is moving downhill) and the torque limit is maintained at the first value (UL1).

Figure 4:
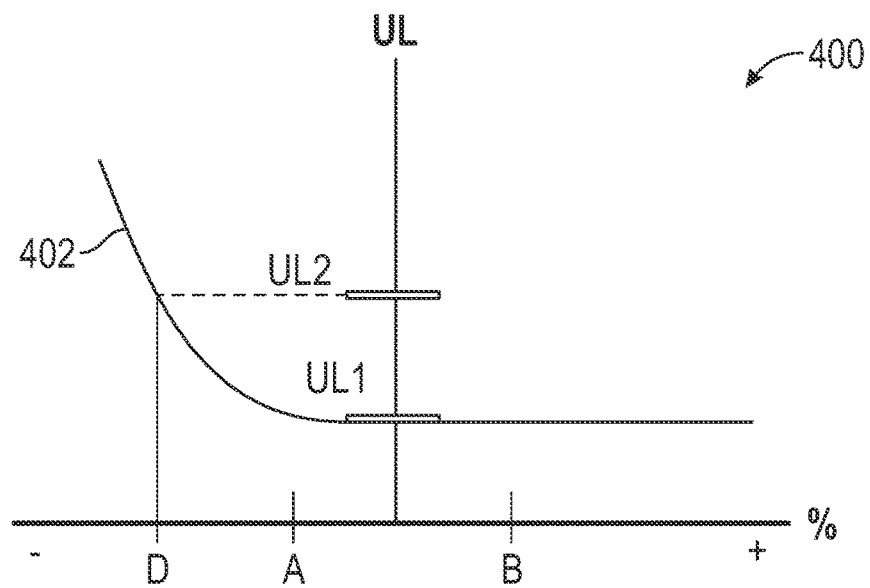
FIG. 4 shows a relation between axle torque limit and road grade for a vehicle in forward gear, in an illustrative embodiment.

FIG. 4 shows a relation 400 between axle torque limit and road grade for a vehicle in forward gear, in an illustrative embodiment. Road grade is shown as a percentage (%) along the abscissa and axle torque upper limit values (UL) are shown along the ordinate axis. The limit is shown by curve 402. When the road grade is zero or near zero, the axle torque upper limit is at a first value (UL1), which is generally a smallest value for the limit. For positive grades, the curve 402 remains at the first value (UL1). For negative grades, the curve 402 increases to a second value (UL2). An illustrative road grade is shown at D along the abscissa, which relates to a second value (UL2) for the axle torque upper limit. The second value (UL2) is greater than the first value (UL1).

Figure 5:
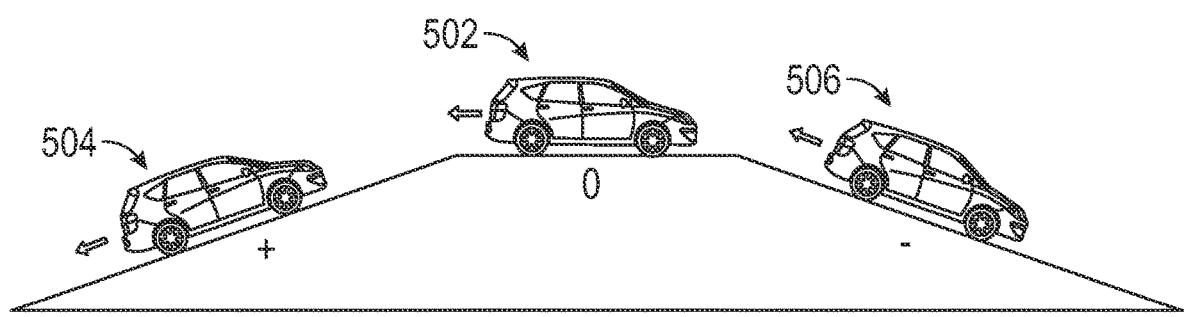
FIG. 5 shows the three road grades being traversed by the electric vehicle with its drive unit in reverse gear.

FIG. 5 shows the three road grades being traversed by the electric vehicle with its drive unit in reverse gear. In a first reverse gear scenario 502, the road grade is zero or near zero (i.e., the vehicle is on a horizontal or near-horizontal terrain) and the axle torque upper limit is placed at the first value (UL1). In a second reverse gear scenario 504, the road grade is positive, (i.e., the vehicle is moving downhill) and the torque limit is maintained at the first value. In a third reverse gear scenario 506, the road grade is negative (i.e., the vehicle is moving uphill) and the torque limit is raised from the first value (UL1) to the second value (UL2).

Figure 6:
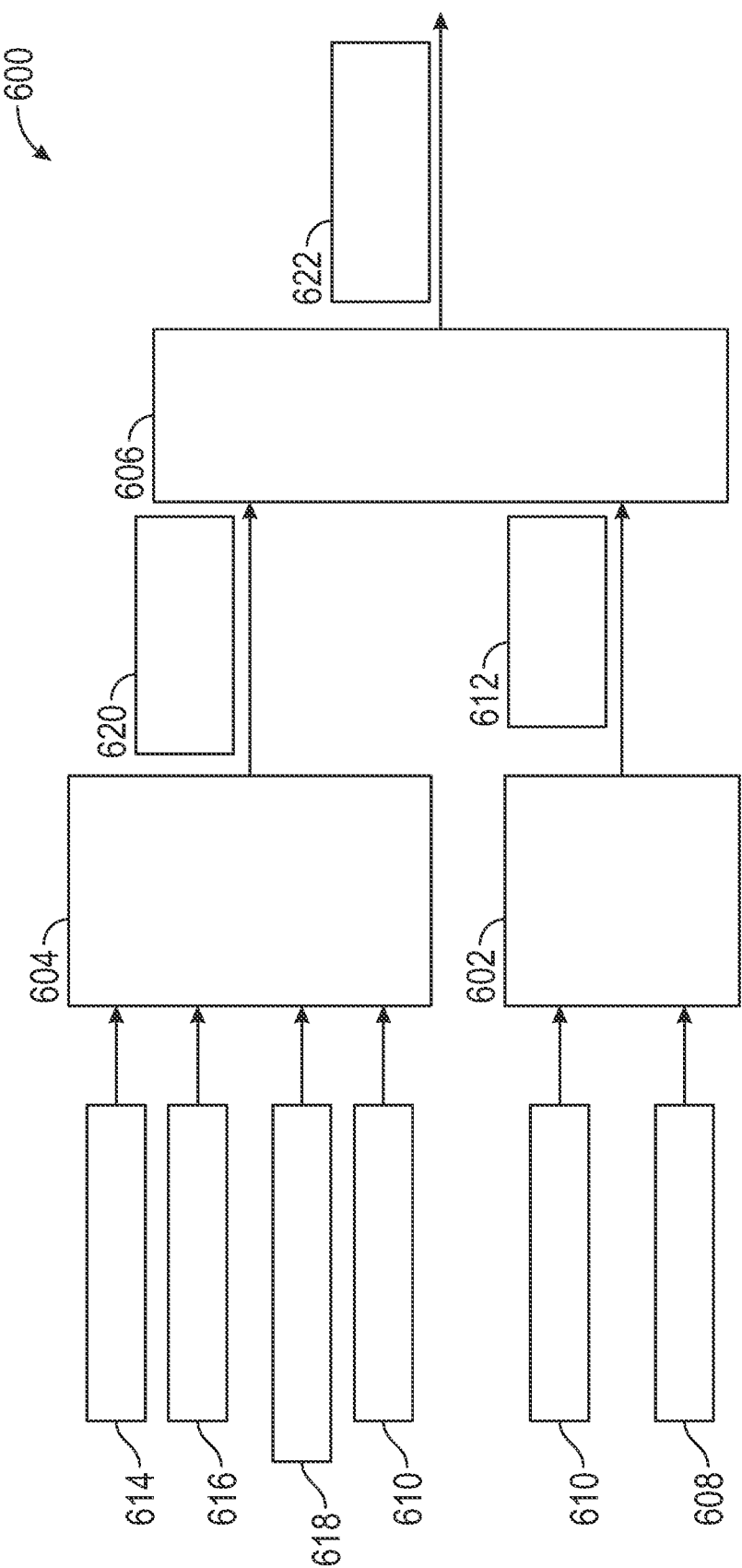
FIG. 6 is a schematic diagram of a process flow for implementing an axle torque limit based on road grade, in an illustrative embodiment.

FIG. 6 is a schematic diagram 600 of a process flow for implementing an axle torque limit based on road grade, in an illustrative embodiment. The process flow involves operation of various modules, such as a torque request module 602, a torque limit module 604, and a minimization module 606, that are performed on the processor of the controller 65.

The torque request module 602 receives a pedal position 608 (from pedal position sensor 76) and a vehicle speed 610 (from speedometer 74). The torque request module 602 determines an axle torque request 612 using a pedal map that includes a mathematical relation between pedal position 608, vehicle speed 610, and axle torque request.

The torque limit module 604 receives a road grade percentage 614 (from road grade sensor 70), a road grade validity signal 616 (from controller 65), a power flow direction 618 (from power flow direction sensor 72) and the vehicle speed 610 (from speedometer 74). The torque limit module 604 calculates a value for an axle torque upper limit 620 based on these parameters. The axle torque upper limit 620 and the axle torque request 612 are provided to the minimization module 606 which generates a clipped axle torque request 622. The clipped axle torque request 622 is a minimum value of the axle torque upper limit 620 and the axle torque request 612.

Figure 7:
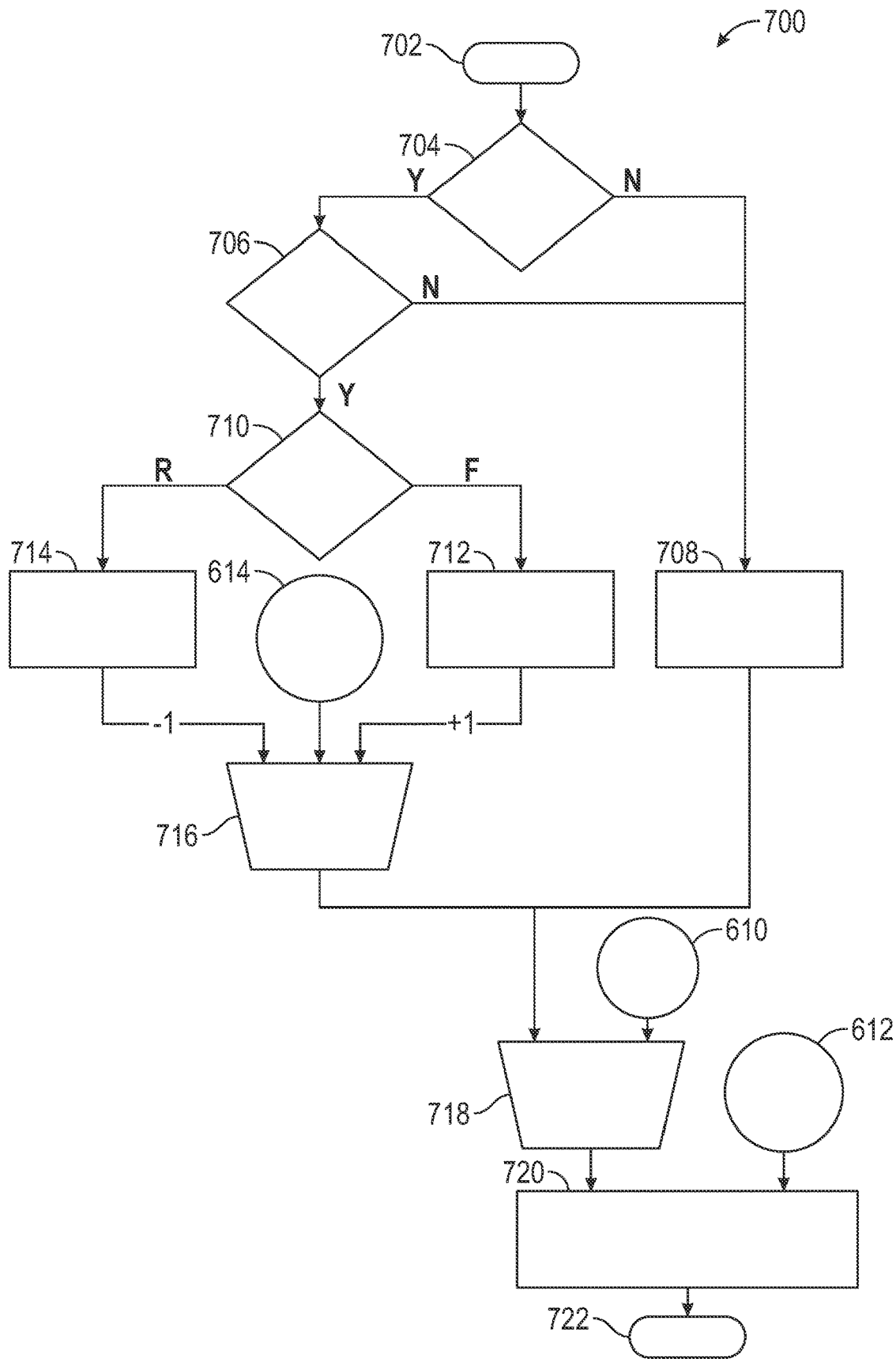
FIG. 7 is a flowchart of a method for implementing a clipped axle torque request at the electric vehicle.

FIG. 7 is a flowchart 700 of a method for implementing a clipped axle torque request 622 at the electric vehicle. The method begins at box 702, in which a road grade is measured. In box 704, the road grade measurement is checked for validity. If the road grade measurement is not valid, the method proceeds to box 708. Otherwise (i.e., road grade measurement is valid), the method proceeds to box 706. In box 706, a power flow direction is obtained and checked for validity. If the power flow direction is not valid, the method proceeds to box 708. Otherwise (i.e., the power flow direction is valid), the method proceeds to box 710. In box 708, a default road grade value is assigned as a value of a processed road grade. From box 708, the method proceeds to box 718, which is discussed below.

Turning to box 710, the power flow direction is determined. If the drive unit is in forward gear, the method proceeds to box 712. In box 712, a sign of the road grade is maintained. In other words, a grade multiplier is set to +1. Returning to box 710, if the drive unit is in reverse gear, the method proceeds to box 714. In box 714, a sign of the road grade is flipped. In other words, the grade multiplier is set to −1.

In box 718, the grade multiplier and road grade measurement are received, the grade multiplier is received from either box 712 or box 714. The road grade measurement is received from box 716. In box 718, a processed road grade is created by multiplying the road grade measurement and the grade multiplier. The processed road grade is provided to box 718.

In box 718, an axle torque upper limit is determined based on the processed road grade (from box 716) and the vehicle speed 610. The axle torque upper limit is provided to box 720. In box 720, the axle torque upper limit (from box 718) and the axle torque request 612 are compared to determine a clipped axle torque request 622. The clipped axle torque request is then implemented at the electric vehicle. The method ends at box 722.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
measuring a road grade of a road section being traversed by the vehicle using a road grade sensor located on the vehicle;
determining an axle torque upper limit for a motor of the vehicle based on the road grade, a vehicle speed and a power flow direction of the vehicle, wherein the axle torque upper limit increases as the road grade increases when the vehicle is moving uphill in forward gear and increases as the road grade decreases when the vehicle is moving uphill in reverse gear;
determining an axle torque request based on the vehicle speed and a pedal position;
determining a clipped axle torque request from the axle torque request and the axle torque upper limit; and
controlling the vehicle by implementing the clipped axle torque request at the vehicle.

2. The method of claim 1, wherein the clipped axle torque request is a minimum value of the axle torque request and the axle torque upper limit.

3. The method of claim 1, wherein the power flow direction is in a forward gear, further comprising determining the axle torque upper limit at one of: (i) a first value when the road grade is within a zero-grade range having an upper grade threshold; (ii) a second value greater than the first value when the road grade is a positive value greater than the upper grade threshold; and (iii) the first value when the road grade is negative.

4. The method of claim 1, wherein the power flow direction is in a reverse gear, further comprising determining the axle torque upper limit at one of: (i) a first value when the road grade is within a zero-grade range having a lower grade threshold; (ii) the first value when the road grade is positive; and (iii) a second value greater than the first value when the road grade is negative and less than the lower grade threshold.

5. The method of claim 1, further comprising selecting a default road grade value when at least one of: (i) a road grade measurement is not valid; and (ii) the power flow direction is not valid.

6. The method of claim 1, wherein the road grade sensor is an accelerometer.

7. The method of claim 1, further comprising determine the axle torque request using a pedal map that includes a mathematical relation between pedal position, vehicle speed and axle torque request.

8. A system for operating a vehicle, comprising:
a road grade sensor for measuring a road grade of a road section being traversed by the vehicle;
a speedometer for measuring a vehicle speed;
a power flow direction sensor for obtaining a power flow direction of the vehicle;
a pedal position sensor for measuring a pedal position; and
a processor configured to:
determine an axle torque upper limit for a motor of the vehicle based on the road grade, the vehicle speed and the power flow direction, wherein the axle torque upper limit increases as the road grade increases when the vehicle is moving uphill in forward gear and increases as the road grade decreases when the vehicle is moving uphill in reverse gear;
determine an axle torque request based on the vehicle speed and the pedal position;
determine a clipped axle torque request from the axle torque request and the axle torque upper limit; and
control the vehicle by implementing the clipped axle torque request at the vehicle.

9. The system of claim 8, wherein the processor is further configured to determine the clipped axle torque request as a minimum value of the axle torque request and the axle torque upper limit.

10. The system of claim 8, wherein the power flow direction is in a forward gear and the processor is further configured to determine the axle torque upper limit at one of: (i) a first value when the road grade is within a zero-grade range having an upper grade threshold; (ii) a second value greater than the first value when the road grade is a positive value greater than the upper grade threshold; and (iii) the first value when the road grade is negative.

11. The system of claim 8, wherein the power flow direction is in a reverse gear and the processor is further configured to determine the axle torque upper limit at one of: (i) a first value when the road grade is within a zero-grade range having a lower grade threshold; (ii) the first value when the road grade is positive; and (iii) a second value greater than the first value when the road grade is negative and less than the lower grade threshold.

12. The system of claim 8, wherein the processor is further configured to select a default road grade value when at least one of: (i) a road grade measurement is not valid; and (ii) the power flow direction is not valid.

13. The system of claim 8, wherein the road grade sensor is an accelerometer.

14. The system of claim 8, wherein the processor is further configured to determine the axle torque request using a pedal map that includes a mathematical relation between pedal position, vehicle speed and axle torque request.

15. A vehicle, comprising:
a road grade sensor for measuring a road grade of a road section being traversed by the vehicle;
a speedometer for measuring a vehicle speed;
a power flow direction sensor for obtaining a power flow direction of the vehicle;
a pedal position sensor for measuring a pedal position; and
a processor configured to:
determine an axle torque upper limit for a motor of the vehicle based on the road grade, the vehicle speed and the power flow direction, wherein the axle torque upper limit increases as the road grade increases when the vehicle is moving uphill in forward gear and increases as the road grade decreases when the vehicle is moving uphill in reverse gear;
determine an axle torque request based on the vehicle speed and the pedal position;
determine a clipped axle torque request from the axle torque request and the axle torque upper limit; and
control the vehicle by implementing the clipped axle torque request at the vehicle.

16. The vehicle of claim 15, wherein the processor is further configured to determine the clipped axle torque request as a minimum value of the axle torque request and the axle torque upper limit.

17. The vehicle of claim 15, wherein the power flow direction is in a forward gear and the processor is further configured to determine the axle torque upper limit at one of: (i) a first value when the road grade is within a zero-grade range having an upper grade threshold; (ii) a second value greater than the first value when the road grade is a positive value greater than the upper grade threshold; and (iii) the first value when the road grade is negative.

18. The vehicle of claim 15, wherein the power flow direction is in a reverse gear and the processor is further configured to determine the axle torque upper limit at one of: (i) a first value when the road grade is within a zero-grade range having a lower grade threshold; (ii) the first value when the road grade is positive; and (iii) a second value greater than the first value when the road grade is negative and less than the lower grade threshold.

19. The vehicle of claim 15, wherein the processor is further configured to select a default road grade value when at least one of: (i) a road grade measurement is not valid; and (ii) the power flow direction is not valid.

20. The vehicle of claim 15, wherein the processor is further configured to determine the axle torque request using a pedal map that includes a mathematical relation between pedal position, vehicle speed and axle torque request.

* * * * *